(12) United States Patent
Fu et al.

(10) Patent No.: US 9,945,965 B2
(45) Date of Patent: Apr. 17, 2018

(54) UNIVERSAL READOUT FOR SILICON PHOTOMULTIPLIER BASED DETECTORS

(71) Applicant: General Electric Company, Schenectady, NY (US)

(72) Inventors: Geng Fu, Rexford, NY (US); Adrian Ivan, Niskayuna, NY (US); Jianjun Guo, Ballston Spa, NY (US); Hao Lai, Niskayuna, NY (US); Hua Qian, Clifton Park, NY (US); Xiao Jin, Brookfield, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/228,300

(22) Filed: Aug. 4, 2016

(65) Prior Publication Data

US 2018/0038966 A1    Feb. 8, 2018

(51) Int. Cl.
*G01T 1/20* (2006.01)
*G01T 1/24* (2006.01)

(52) U.S. Cl.
CPC .............. *G01T 1/247* (2013.01); *G01T 1/248* (2013.01); *G01T 1/249* (2013.01)

(58) Field of Classification Search
CPC ..... G01T 7/005; G01T 1/1642; G01T 1/2985; G01T 1/2018; G01T 1/248; G01T 1/1644; G06T 11/003; G06T 11/006; G06T 2211/436

See application file for complete search history.

(56) References Cited

U.S. PATENT DOCUMENTS

| 8,849,002 B2 | 9/2014 | Chinn et al. | |
|---|---|---|---|
| 9,194,959 B2 | 11/2015 | Schmand et al. | |
| 2002/0134942 A1* | 9/2002 | Pehl | G01T 1/2928 250/369 |
| 2007/0235657 A1* | 10/2007 | He | G01T 7/005 250/389 |
| 2011/0001053 A1* | 1/2011 | Solf | G01T 1/249 250/370.08 |

(Continued)

OTHER PUBLICATIONS

Omura et al., "Development of a high-resolution four-layer DOI detector using MPPCs for Brain PET," 2012, IEEE Nuclear Science Symposium and Medical Imaging Conference Record, pp. 3560-3563.*

(Continued)

*Primary Examiner* — Kiho Kim
(74) *Attorney, Agent, or Firm* — Pabitra K. Chakrabarti

(57) ABSTRACT

A SiPM readout circuit includes a front-end circuit having amplifiers coupled to SiPM analog outputs, pixel readout channels coupled to amplifiers provide a timing signal representing gamma ray photon detection in individual SiPM, a block timing channel that creates a summed signal from all SiPMs, and generates a block timing signal and a validation signal, an energy channel that generates a summed energy signal and a two-dimensional position of the gamma ray photon detection in the block, and a control logic/processing circuit that performs a time stamp estimation method. Methods of determining the radiation event timing and a non-transitory computer-readable medium containing computer-readable instructions to implement the methods are disclosed.

11 Claims, 3 Drawing Sheets

(56) References Cited

U.S. PATENT DOCUMENTS

2011/0278466 A1    11/2011    Frach et al.
2015/0285922 A1    10/2015    Mintzer et al.

OTHER PUBLICATIONS

Aliaga et al., "Evaluation of a modular PET system architecture with Synchronization over data links," Feb. 2014, IEEE Transactions on Nuclear Science, vol. 61, No. 1, pp. 88-98.*
Ciciriello et al., "BASIC32_ADC, a front-end ASIC for SiPM Detectors," 2013, IEEE Nuclear Science Symposium and Medical Imaging Conference, pp. 1-6.*
Xu, Tianpeng et al., "Development of Multi-Channel Fast SiPM Readout Electronics for Clinical TOF PET Detector", 2014 IEEE Nuclear Science Symposium, Nov. 8-15, 2014, 3pgs.
Paule, Robert C. et al., "Consensus Values and Weighting Factors", Journal of Research of the National Bureau of Standards, vol. 87, No. 5, Sep.-Oct. 1982, (pp. 377-385, 9 total pages).
Wagadarikar, Ashwin A. et al., "Sensitivity Improvement of Time-of-Flight (ToF) PET Detector Through Recovery of Compton Scattered Annihilation Photons", IEEE Transactions on Nuclear Science, vol. 61, No. 1, Feb. 2014, (pp. 121-125, 5 total pages).
Roncali, Emilie et al., "Application of Silicon Photomultipliers to Positron Emission Tomography", Annals of Biomedical Engineering, vol. 39, No. 4, Apr. 2011, DOI: 10.1007/s10439-011-0266-9, (pp. 1358-1377, 20 total pages).
Kim, H. et al., "A Multi-Threshold Sampling Method for TOF PET Signal Processing", Nucl Instrum Methods Phys Res A., Apr. 21, 2009 602(2), DOI: 10.1016/j.nima.2009.01.1000, (pp. 618-621, 13 total pages).

* cited by examiner

UNIVERSAL READOUT FOR SILICON PHOTOMULTIPLIER BASED DETECTORS

BACKGROUND

Silicon photomultipliers (SiPMs), which are also commonly referred to as MicroPixel Photon Counters (MPPC) or MicroPixel Avalanche Photodiodes (MAPD) have become popular for use as photosensors in positron emission tomography (PET) scanners. SiPMs are tiled arrays of up to tens of thousands of avalanche photodiodes of typical size between 10 to 100 microns, connected in parallel on a common silicon substrate and working on common load. The output of an SiPM device is typically connected to a buffer amplifier, which can be implemented as a transimpedance amplifier. In PET detectors, several SiPM devices are grouped together and are optically coupled to scintillator crystals that convert the 511 kiloelectronvolt (keV) annihilation photons, forming a detector block.

In a clinical whole-body PET scanner, which consists of a large number of detector blocks arranged in a ring around the patient bore, each block conventionally shares timing, position and energy readout electronics to reduce the total number of readout channels for cost consideration. The coincidence resolving time (CRT) of each detector block is an important factor affecting the image quality of the reconstructed distribution of the positron-emitting radioisotope in patients.

Compared to conventional vacuum photomultiplier tube (PMT), SiPM has the advantages of compact size and allowing mass production with reduced variability and lower cost per unit of photosensitive area. Other superior characteristics are related to operation and performance, such as: higher photon detection efficiency (PDE), lower bias voltage, better timing resolution, and insensitivity to magnetic fields. However, SiPM has the disadvantages of higher dark count rate, slower fall time of output pulse relative to PMT, and signal-correlated spurious effects such as cross-talk and after-pulsing. These effects are cumulative with the number of SiPM devices connected into a PET detector block, and result in significant timing resolution degradation as the block size is increased.

DETAILED DESCRIPTION

Embodying devices and methods provide a universal readout circuit design for an SiPM-based PET detector at a high multiplexing level along with methods and procedures for improving coincidence resolving time (CRT) of PET systems. Embodying devices simplify the readout electronic, thus reducing detector cost while maintaining excellent timing performance.

An embodying pixel readout circuit can provide event timing information with minimized dark noise contribution while removing optical crosstalk from other channels. For light-sharing events (e.g., Compton scattering event between adjacent pixels), multiple timing signals can be utilized in the digital domain to derive better estimation of gamma ray (i.e., about a 511 keV annihilation photon) interaction time. For the same event, a block readout circuit can sum the output signal of all SiPMs in the analog domain to achieve minimal quantum noise.

Figure 1:
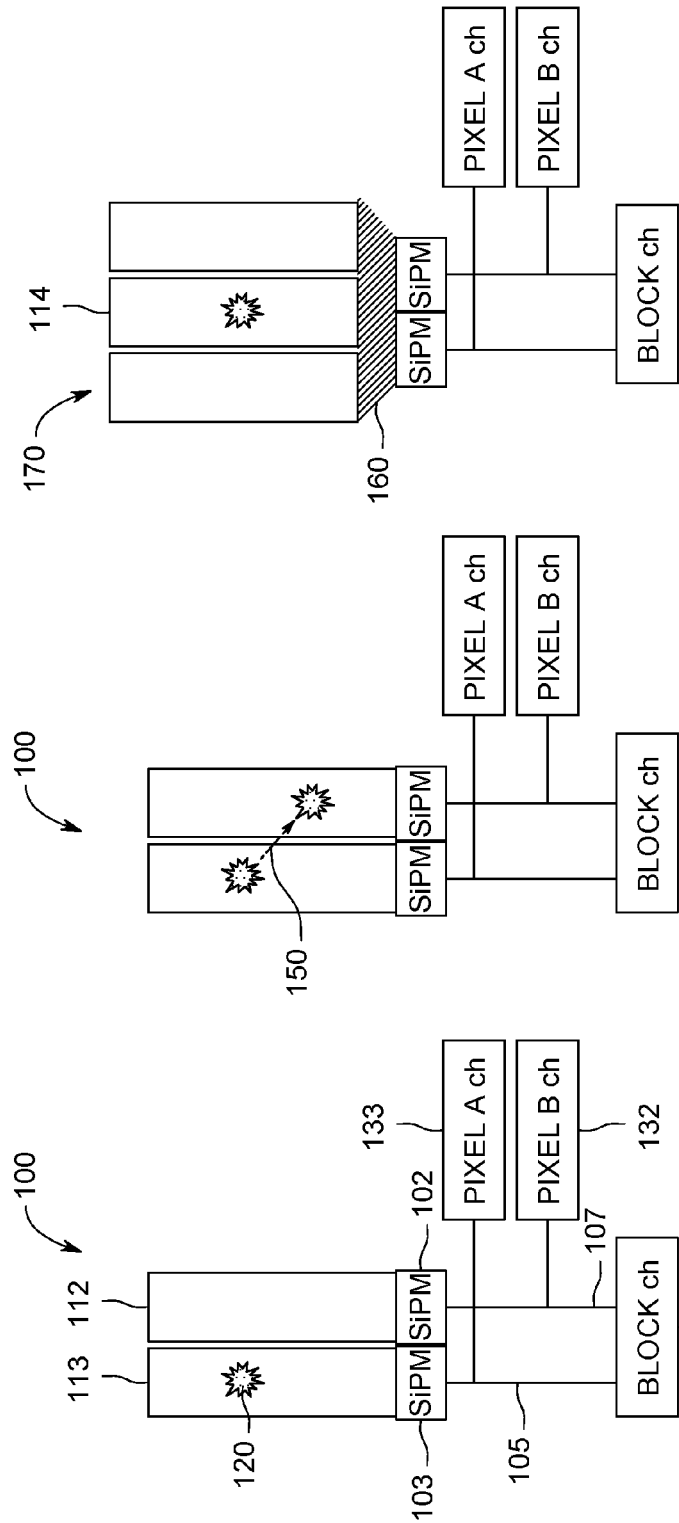
FIGS. 1A-1C depict diagrams of radiation events in adjacent pixels of an SiPM-based detector.

FIGS. 1A-1C depict diagrams of radiation events in adjacent pixels of an SiPM-based detector. FIG. 1A depicts adjacent pixels 100 in accordance with embodiments. Adjacent pixels 100 include respective SiPM 102, 103, scintillator crystal 112, 113. SiPM 102, 103 each provide an output signal to block channel 140. Additionally, SiPM 103 provides an output signal to pixel channel A 133; and SiPM 102 provides an output signal to pixel channel B 132.

FIG. 1A depicts radiation event 120 in single crystal 113 (with 1:1 coupling between the crystal and SiPM). Under the FIG. 1A radiation event scenario, only the output signal 105 of SiPM 103 passes on the signal of detected photon to block channel 140 and pixel A channel 133.

FIG. 1B depicts adjacent pixels 100 undergoing a radiation event scenario where about a 511 keV annihilation photon 120 interacts with crystal 113, and then deposits only part of its energy in Compton scattering. The scattered photon then traverses path 150 and may be detected in crystal 112. Both SiPM 102 and SiPM 103 provide a respective output signal 105, 107 generated by primary and secondary interaction to block channel 140, and respectively to pixel channel A 133 and pixel channel B 132.

FIG. 1C depicts adjacent pixels 170, which includes respective SiPMs 102, 103, scintillator crystals 112, 113, 114, and light guide 160. When about a 511 keV annihilation photon is detected, light guide 160 collects the generated optical photons and guides them to both SiPMs 102, 103 which each provides a respective output signal 105, 107 to block channel 140 and respectively to pixel channel A 133 and pixel channel B 132.

Figure 2:
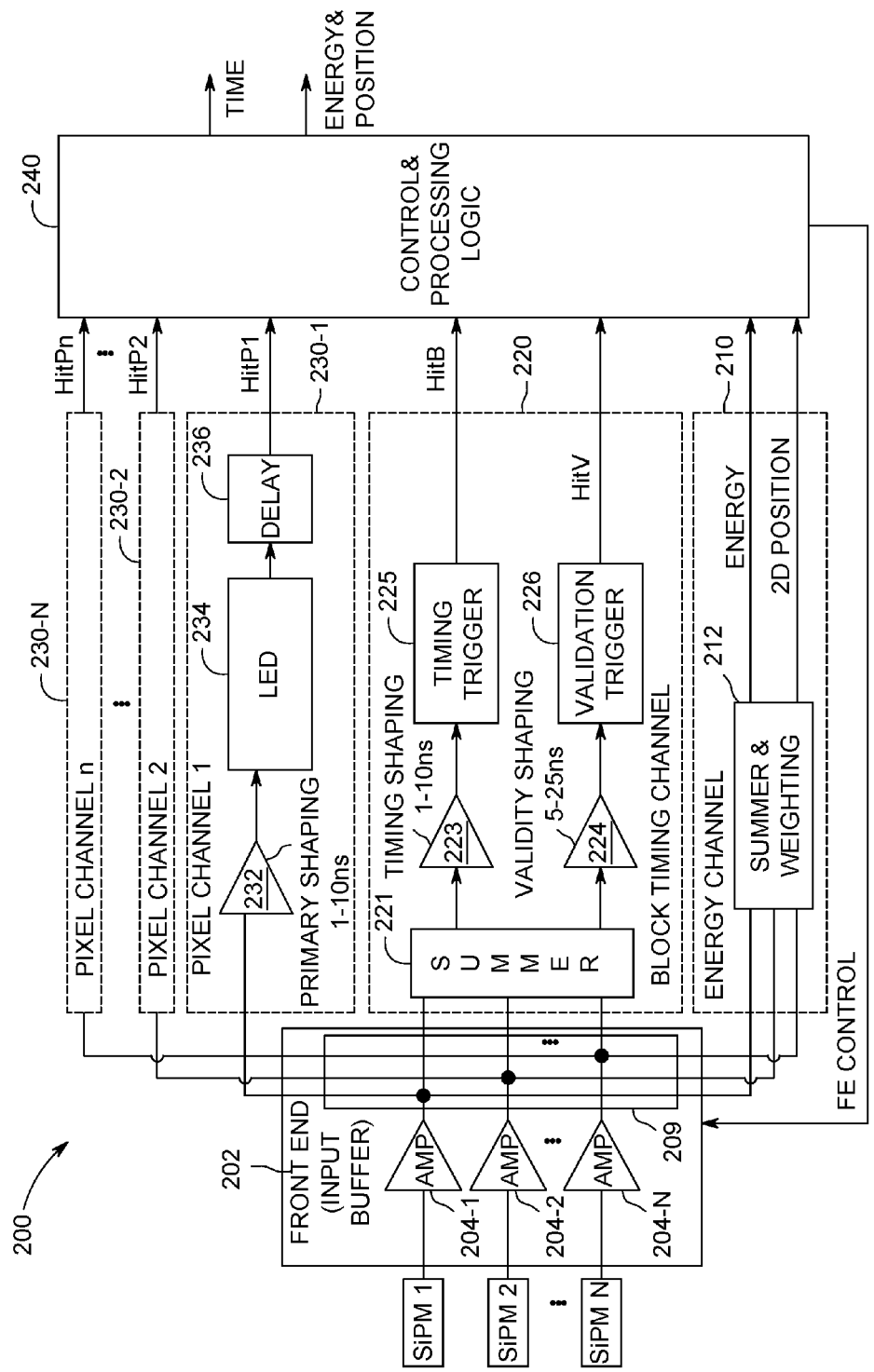
FIG. 2 depicts a block diagram of a universal readout circuit for an SiPM array in accordance with embodiments.

FIG. 2 depicts a block diagram of universal readout circuit 200 for a SiPM based detector block in accordance with embodiments. Universal readout circuit 200 includes front end (FE) circuit 202, which can function as a current buffer and receive output signals (e.g., output signals 105, 107) from the array of SiPMs, e.g. SiPM1, SiPM2, . . . , SiPMn. When a 511 keV annihilation photon interacts with the scintillator, optical photons are generated. These optical photons are detected by at least one of the SiPMs producing current signal. Each output signal is coupled to a respective buffer amplifier 204-1, 204-2, . . . , 204-N that have a very low input impedance and high bandwidth. FE control signal is provided by control/processing logic circuit 240 to vary the input impedance and bandwidth of the buffer amplifiers in order to optimize them for various type of SiPM devices. Front end circuit 202 can amplify and split the signals received from each of the SiPMs into three copies using a current mirror circuit 209, which is coupled to three channels—energy channel 210, block timing channel 220, and respective pixel channels 230-1, 230-2, . . . , 230-N.

Energy channel 210 includes summer/weighting circuit 212 that provides the control/processing logic circuit 240 with energy level and two-dimensional position (X and Y) of a radiation event on separate outputs. In some implementations, the circuit is configured to generate a weighted sum of the energy signals as well as the row and column coordinates from all SiPMs in the array.

Block timing channel 220 generates a timing signal HitB and a validation signal HitV that are provided to the control/processing logic circuit. In block timing channel 220 the output signals from all SiPMs in the array/block are summed together in summer 221. The summed signal can be used by both a time discriminating circuit for generating timing information and a validation circuit for validation of a true event.

The time discriminating circuit shapes the summed signal with shaping circuit 223 that high-pass filters the summed signal with a short time constant (e.g. 1-10 nanoseconds) to provide a high degree of timing accuracy. The shaped signal is then compared to the current threshold, which is set just above the dark current noise level. If the pulse is above the predetermined threshold of leading edge discriminator 225, the block timing trigger HitB provides timing information to the control/processing logic circuit 240.

The validation circuit of block timing channel 220 includes validity shaping circuit 224 with a relatively long time constant (e.g. 5-25 nanoseconds) for confirmation whether a valid radiation event has been detected by any of the SiPM in the block. The threshold level of validation channel discriminator 226 is set higher than the dark current noise level to generate a validation signal (HitV). This validation signal is also fed to control/processing logic circuit 240 for reduction of dead time. If a block timing trigger HitB is present but the validation signal (HitV) is not present, the pulse is known to be the result of a noise event and rejected for image reconstruction.

For each SiPM in the block, SiPM_i (i=1–N), an output signal from front end buffer 202, is provided to a corresponding pixel channel 230-i (e.g., 230-1, 230-2, . . . , 230-N). Each pixel channel includes a shaping circuit 232, a leading edge discriminator 234, and a delay circuit 236. A corresponding timing signal HitP_i (e.g., HitP1, HitP2, . . . , HitPN) is provided from each pixel channel to control/processing logic circuit 240. To obtain accurate time stamp, the pixel channels are configured with a short shaping time (1-10 ns) and a low threshold.

When the optical signal is of low amplitude with a large decay time constant, e.g. in bismuth germanium oxide (BGO) based detectors, the validation circuit (validity shaping circuit 224 and validation channel discriminator 226) may be designed with a longer shaping time (>10 ns) compared to the shaping time of the pixel channel shaping circuits 232 and block timing shaping circuit 223. Consequently, a higher threshold level could be implemented in the validation circuit, which reduces the count rate while effectively discriminating radiation event with low energy deposition.

Control/processing logic circuit 240 registers the position of pixel channels having hits (i.e., radiation events). The timing, energy, and two-dimensional position information of a radiation event are sent to an external processor (e.g., time-to-digital converter (TDC), field programmable gate array, microcontroller, microprocessor, etc.) for further processing. For single pixel events, logic circuit 240 is configured to send the timing signal of triggered pixel channel HitP to the external processor. Since the dark noise is low and there is no crosstalk, this configuration yields the best timing performance.

For multiple pixel events (e.g., Compton scattering events), logic circuit 240 is configured to record the first two pixel-channel signals (HitP) to cover most of the energy deposition. Using the first two signals from pixel channels, an optimal time stamp may be estimated when combining with the time signal HitB.

Time stamp estimation can be performed by methods in accordance with embodying methods. The time stamp estimation obtained by the embodying methods can be applied to obtain improved CRT, which results in an improvement in signal-to-noise ratio and image quality over conventional methods.

In accordance with embodying methods, for a single pixel event (e.g., FIG. 1A) a time stamp can be obtained from the triggered pixel channel. In accordance with embodying methods, a time stamp estimation for multiple pixel events (e.g., FIGS. 1B-1C) can be obtained by at least one of three methods depending on the complexity and timing performance of the block and pixel channels.

One method can obtain time stamp directly using the block channel timing signal (HitB). In a second embodying method, timing determination can be made based on the measurement of the different energy deposition in multiple pixels. The timing signal of the pixel channel may be used when it is triggered by an energy deposition close to about 511 keV. Or the timing stamp could utilize the block timing signal when energy deposition is more uniformly distributed on multiple pixels. This timing determination can be based on look-up table data, and/or curve-fitting equation(s). In accordance with a third embodying method, all three timing signals e.g., pixel A, pixel B, and block channel data may be considered together.

In accordance with embodiments, timing information can be recovered by using a look-up table (with interpolation) and/or curve fitting equations applied to energy and timing data for pixel A, pixel B, and block signal depending on different energy range. For example, a multi-pixel event timing estimation can be obtained using data from either pixel A and pixel B, which collects most of optical photons (e.g., about >80%); otherwise the hybrid timing estimation can be obtained using both pixel data and block data.

Major sources of noise in timing determination include quantum noise, dark current/electronic noise, optical photon propagation inside crystal, and timing jitter of SiPM response. Because the block channel readout has dark current noise and electronic noise contribution from a number (N) of pixels and corresponding buffer amplifiers, the variance of block timing signal $\sigma_{Block}^2$ typically is far greater than the variance of pixel timing signal $\sigma_{Pixel}^2$. For multiple pixel events, the variance of pixel timing signal is dominated by the optical photon collection (energy deposition) in individual SiPM device.

Figure 3:
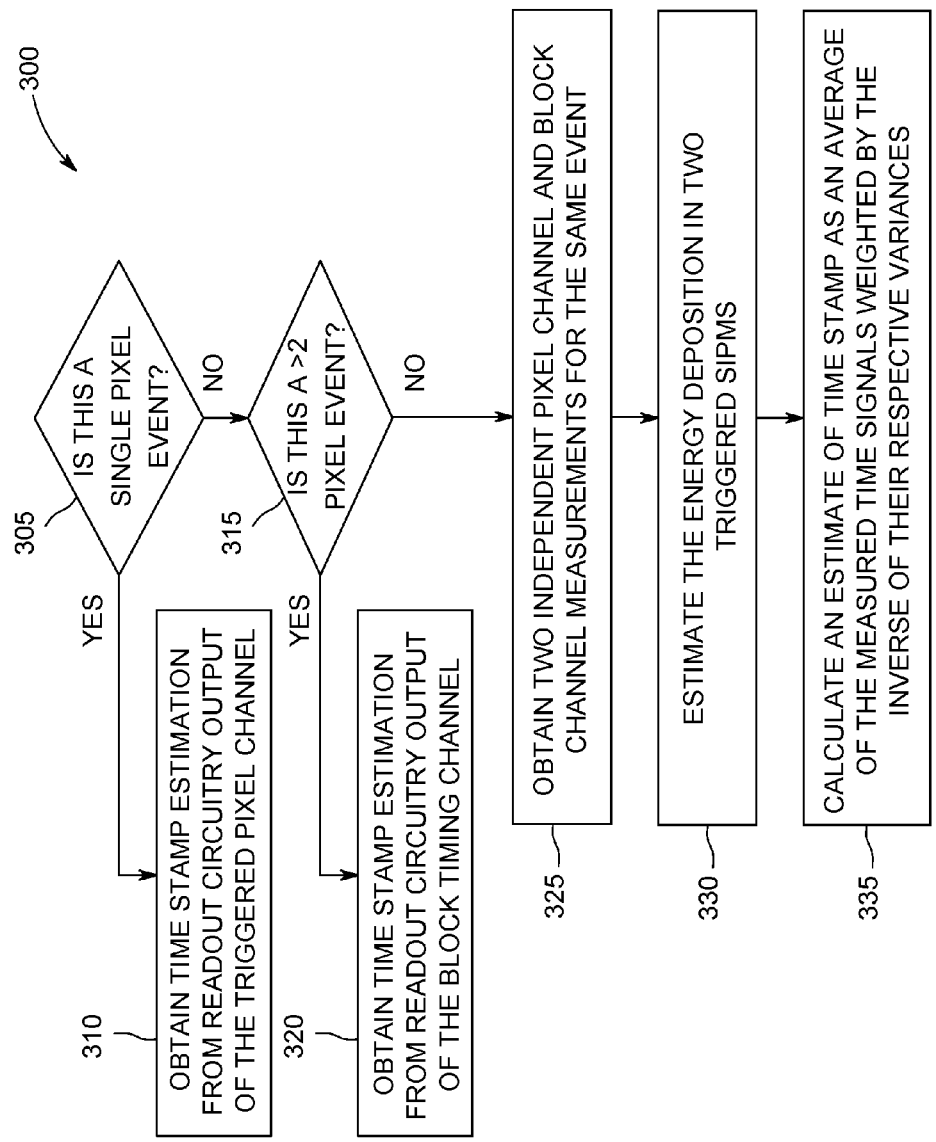
FIG. 3 depicts a process to improve the coincidence resolving time of PET scanners in accordance with embodiments.

FIG. 3 depicts process 300 illustrating a timing resolution improvement algorithm in accordance with embodiments. Universal readout circuit 200 provides pixel-based readouts for individual SiPM device, as well as a block timing readout, and thus may provide multiple timing signals for a single gamma ray event. By utilizing these multiple timing signals and applying a weighted average, the CRT of the block can be improved.

The decision process 300 determines first (step 305), whether the radiation event is a single pixel event (see FIG. 1A) or a multiple pixel event (see FIGS. 1B-1C). If it is a single pixel event, a time stamp estimation is obtained (step 310) from the readout circuitry associated with the triggered pixel channel. It should be readily understood that process 300 operates on pixel channel signals from radiation events that have been validated as described previously with regard to validation signal HitV.

If the event is a multiple pixel event (i.e., two or more pixels), a determination is made on whether there are more than two pixels (step 315). If the event involves more than two pixels, the time stamp is obtained from the block timing channel (step 320).

If there are only two pixels involved in the event, their respective pixel-channel signals (e.g., time trigger signal $T_A$ and time trigger signal $T_B$), along with block signal $T_{block}$ are obtained (step 325). The energy depositions in each of the two triggered SiPMs are estimated, step 330, based on the weighted SiPM signal from energy channel 210. The time signals $T_A$, $T_B$ from each pixel channel represent an independent measurement of the arrival time of the 511 keV annihilation photon. The estimated energy depositions (e.g. $E_A$ and $E_B$) are used to calculate, step 335, an estimated time stamp ($T_{stamp}$) as an average of the measured time signals weighted by the inverse of their respective variances.

A weighted mean of the time stamp $T_{stamp}$ from the same event can be expressed as shown in equation 1:

$$T_{stamp} = \frac{\sigma^2_{Pixel\ B}(E_B) * T_A + \sigma^2_{Pixel\ A}(E_A) * T_B}{\sigma^2_{Pixel\ A}(E_A) + \sigma^2_{Pixel\ B}(E_B)} \quad (EQ.\ 1)$$

From these independent measurements (pixel channels and/or block channel) of the same event, the estimated $T_{stamp}$ presents a reduction in the variance and thus improves the CRT.

Embodying systems and methods can process noisy and slow signals generated by SiPM, to offer improved timing performance with a reduction in the number of electronic channels. This reduction in readout channels, and the ability to accurately process noisy and slow signals can be used to produce low cost non-TOF and TOF-PET scanners while offering good timing capabilities.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as time stamp determination in PET scanners using individual pixel-based channel and block channel data from a SiPM array, as described above.

The computer-readable medium may be a non-transitory computer-readable media including all forms and types of memory and all computer-readable media except for a transitory, propagating signal. In one implementation, the non-volatile memory or the computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A readout circuit for a silicon photomultiplier (SiPM)-based detector having a plurality of pixels for detecting a radiation event, the readout circuit comprising:
    a front end circuit including a plurality of buffer amplifiers, each buffer amplifier coupled to a respective SiPM of a SiPM array for receiving an output signal from each SiPM;
    a plurality of pixel channels, each of the plurality of pixel channels coupled to a respective buffer amplifier; each of the plurality of pixel channels configured to provide a pixel timing signal that represents a time indication of a radiation event detected by one or more pixels of the SiPM array;
    a block timing channel coupled to the front end circuit, and configured to provide a timing signal that represents a time indication of the radiation event detected any SiPM in the array of SiPMs, and to provide a validation signal used to validate the radiation event;
    an energy channel coupled to the front end circuit, the energy channel including a summer/weighting circuit configured to generate a summed energy output signal from the SiPM array that represents a cumulative energy level of the radiation event detected by the SiPM array; and a weighted sum signal of row and column signals of all SiPMs from the SiPM array that represents a two-dimensional position of the radiation event detected by the SiPM array; and
    a control logic/processing circuit configured to perform a time stamp estimation utilizing signals provided to the control logic/processing circuit from each pixel channel, the block timing channel, and the energy channel, wherein the control logic/processing circuit is configured to determine if the radiation event is a single pixel event, a two-pixel event, or a greater than two pixel event, and if the radiation event is a single pixel event, obtaining the time stamp from a pixel readout channel associated with the single pixel; and if the radiation event is a two-pixel event, calculating a weighted time stamp using time signals from respective pixel readout channels and the block timing channel; and if the radiation event is a greater than two pixel event, obtaining the time stamp from the block timing channel.

2. The readout circuit of claim 1, including the control logic/processing circuit configured to provide a control signal to the front end circuit, the front end circuit configured to vary input impedance, bandwidth, and bias voltage of each buffer amplifier based on the control signal.

3. The readout circuit of claim 1, the energy channel including the summed energy output signal indicating an energy level of the radiation event.

4. A readout circuit for a silicon photomultiplier (SiPM)-based detector having a plurality of pixels for detecting a radiation event, the readout circuit comprising:
    a front end circuit including a plurality of buffer amplifiers, each buffer amplifier coupled to a respective SiPM of a SiPM array for receiving an output signal from each SiPM;
    a plurality of pixel channels, each of the plurality of pixel channels coupled to a respective buffer amplifier; each of the plurality of pixel channels configured to provide a pixel timing signal that represents a time indication of a radiation event detected by one or more pixels of the SiPM array.
    a block timing channel coupled to the front end circuit, and configured to provide a timing signal that represents a time indication of the radiation event detected any SiPM in the array of SiPMs, and to provide a validation signal used to validate the radiation event;
    an energy channel coupled to the front end circuit, the energy channel including a summer/weighting circuit configured to generate a summed energy output signal from the SiPM array that represents a cumulative energy level of the radiation event detected by the SiPM array; and a weighted sum signal of row and column signals of all SiPMs from the SiPM array that represents a two-dimensional position of the radiation event detected by the SiPM array; and a control logic/processing circuit configured to perform a time stamp estimation utilizing signals provided to the control logic/processing circuit from each pixel channel, the block timing channel, and the energy channel, wherein the timing block channel further includes a summer configured to sum signals from the SiPMs and provide a summed signal to a timing discriminating circuit and to a validation circuit;

the time discriminating circuit including a first shaping circuit and a first leading edge discriminator, the first shaping circuit configured to filter the summed signal with a first time constant, the leading edge discriminator configured to compare an output of the first shaping circuit to a predetermined threshold;

if the output level is above the predetermined threshold, the block timing trigger signal is provided to the control logic/processing circuit; and the validation circuit including a second shaping circuit and a second leading edge discriminator, the second shaping circuit configured to filter the summed signal with a second time constant, the second leading edge discriminator configured to compare an output of the second shaping circuit to a second predetermined threshold;

if the second output level is above the second predetermined threshold, the validation signal is provided to the control logic/processing circuit.

5. The readout circuit of claim 4, including:

the first shaping circuit including a high-bandwidth band-pass filter having a first time constant of about 1-10 nanoseconds; and the second shaping circuit including a high-bandwidth band-pass filter having a time constant of about 5-25 nanoseconds.

6. A readout circuit for a silicon photomultiplier (SiPM)-basede detector having a plurality of pixels for detecting a radiation event, the readout circuit comprising:

a front end circuit including a plurality of buffer amplifiers, each buffer amplifier coupled to a respective SiPM of a SiPM array for receiving an output signal from each SiPM;

a plurality of pixel channels, each of the plurality of pixel channels coupled to a respective buffer amplifier; each of the plurality of pixel channels configured to provide a pixel timing signal that represents a time indication of a radiation event detected by one or more pixels of the SiPM array;

a block timing channel coupled to the front end circuit, and configured to provide a timing signal that represents a time indication of the radiation event detected any SiPM in the array of SiPMs, and to provide a validation signal used to validate the radiation event;

an energy channel coupled to the front end circuit, the energy channel including a summer/weighting circuit configured to generate a summed energy output signal from the SiPM array that represents a cumulative energy level of the radiation event detected by the SiPM array; and a weighted sum signal of row and column signals of all SiPMs from the SiPM array that represents a two-dimensional position of the radiation event detected by the SiPM array; and a control logic/processing circuit configured to perform a time stamp estimation utilizing signals provided to the control logic/processing circuit from each pixel channel, the block timing channel, and the energy channel, wherein the plurality of pixel readout channels further includes a signal shaping circuit comprising a high-bandwidth band-pass filter having a time constant of about 1-10 nanoseconds;

a leading edge discriminator configured to compare an output signal of the signal shaping circuit to a predetermined threshold; and if the output signal level is above the predetermined threshold, the pixel timing signal is provided to the control logic/processing circuit.

7. The readout circuit of claim 1, including the control logic/processing circuit configured to provide an output to an external processor, the output containing radiation event energy information, timing information, and two-dimensional position information.

8. A method of determining a time stamp of a radiation event, the method comprising:

detecting a radiation event by one or more pixels of a SiPM array;

validating the radiation event;

determining if the radiation event is a single pixel event, a two-pixel event, or a greater than two pixel event;

if the radiation event is a single pixel event, obtaining the time stamp from a pixel readout channel associated with the single pixel;

if the radiation event is a greater than two pixel event, obtaining the time stamp from readout circuitry associated with the block timing channel; and if the radiation event is a two-pixel event, calculating a weighted time stamp using time signals from respective pixel readout channels and the block timing channel.

9. The method of claim 8, the steps of a weighted time stamp calculation including:

estimating energy disposition associated with each of the two pixels; and calculating a weighted time stamp as an average of the measured time signals weighted by the inverse of their respective variances.

10. A non-transitory computer readable medium containing computer-readable instructions stored therein for causing a control processor to perform operations for determining a time stamp of a radiation event, the operations comprising:

detecting a radiation event by one or more pixels of a SiPM array;

validating the radiation event;

determining if the radiation event is a single pixel event, a two-pixel event, or a greater than two pixel event;

if the radiation event is a single pixel event, obtaining the time stamp from a pixel readout channel associated with the respective pixel;

if the radiation event is a greater than two pixel event, obtaining the time stamp from readout circuitry associated with a block timing channel of the SiPM array; and if the radiation event is a two-pixel event, calculating a weighted time stamp using the time signals from respective pixel readout channels and the block timing channel.

11. The non-transitory computer readable medium of claim 10, the instructions further causing the control processor to perform the calculating a weighted time stamp step by:

including:
estimating energy deposition associated with each of the two pixels; and
calculating the weighted time stamp as an average of the measured time signals weighted by the inverse of their respective variances.

* * * * *